US011390162B2

(12) United States Patent
Perusic

(10) Patent No.: US 11,390,162 B2
(45) Date of Patent: Jul. 19, 2022

(54) VEHICLE MOUNTED PEDAL BOX ASSEMBLIES

(71) Applicant: Daryl Perusic, The Oaks (AU)

(72) Inventor: Daryl Perusic, The Oaks (AU)

(*) Notice: Subject to any disclaimer, the term of this patent is extended or adjusted under 35 U.S.C. 154(b) by 0 days.

(21) Appl. No.: 17/193,503

(22) Filed: Mar. 5, 2021

(65) Prior Publication Data
US 2021/0188085 A1 Jun. 24, 2021

Related U.S. Application Data

(63) Continuation of application No. 15/306,354, filed as application No. PCT/AU2015/000237 on Apr. 23, 2015, now abandoned.

(30) Foreign Application Priority Data

Apr. 23, 2014 (AU) ................................ 2014901463

(51) Int. Cl.
| B60K 23/00 | (2006.01) |
| F02D 11/02 | (2006.01) |
| G05G 1/36 | (2008.04) |
| B60T 7/06 | (2006.01) |
| B60K 23/02 | (2006.01) |
| B60K 26/02 | (2006.01) |
| B62D 65/02 | (2006.01) |

(Continued)

(52) U.S. Cl.
CPC .............. *B60K 23/00* (2013.01); *B60K 23/02* (2013.01); *B60K 26/02* (2013.01); *B60T 7/06* (2013.01); *B62D 65/02* (2013.01); *F02D 11/02* (2013.01); *G05G 1/36* (2013.01); *G05G 1/40* (2013.01); *B60K 2023/025* (2013.01); *B60K 2026/024* (2013.01); *G05G 23/00* (2013.01)

(58) Field of Classification Search
CPC ........ B60K 23/00; B60K 23/02; B60K 26/02; B60K 2026/024; B60K 2023/025; B62D 65/02; G05G 1/40; G05G 1/36; G05G 23/00; B60T 7/06; F02D 11/02
See application file for complete search history.

(56) References Cited

U.S. PATENT DOCUMENTS

| 3,691,868 A | * | 9/1972 | Smith | ................. B60W 10/18 74/512 |
| 2004/0129106 A1 | * | 7/2004 | Prat | .......................... B60T 7/06 74/512 |
| 2011/0296945 A1 | * | 12/2011 | Jaouen | .................. G06F 3/0334 74/512 |

FOREIGN PATENT DOCUMENTS

| CN | 112874297 B | * | 12/2021 | ............. B60K 23/02 |
| DE | 4122629 A1 | * | 1/1993 | ............. B60K 23/00 |
| WO | WO 03044614 A1 | * | 5/2003 | ............... G05G 1/14 |

(Continued)

OTHER PUBLICATIONS

EPO Bib. of DE 4122629 A1, Fischer et al., dated Jan. 1993 (Year: 1993).*

*Primary Examiner* — Vinh Luong
(74) *Attorney, Agent, or Firm* — Stephen J. Weyer, Esq.; Stites & Harbison, PLLC

(57) ABSTRACT

A pedal box for a vehicle comprises at least one of a brake assembly, clutch assembly and throttle assembly each mounted on an axis supported by a first mounting plate; a master cylinder operatively connected to each said brake assembly and clutch assembly; wherein the pedal box assembly, includes at least one articulating mounting member which allows the pedal box assembly to accommodate a variety of vehicle floor geometries.

5 Claims, 18 Drawing Sheets

(51) Int. Cl.
*G05G 1/40* (2008.04)
*G05G 23/00* (2006.01)

(56) References Cited

FOREIGN PATENT DOCUMENTS

| WO | WO 2004053617 A1 | * | 6/2004 | ............... G05G 1/14 |
| WO | WO 2013186953 A1 | * | 12/2013 | ............. B60K 23/02 |
| WO | PCT/AU2015/000237 | * | 10/2015 | ............. B60K 23/00 |

* cited by examiner

VEHICLE MOUNTED PEDAL BOX ASSEMBLIES

CROSS REFERENCE TO RELATED APPLICATIONS

This is a continuation of U.S. patent application Ser. No. 16/306,354 filed Oct. 24, 2016, a § 371 national stage application of PCT/AU2015/000237, both herein incorporated by reference.

FIELD OF THE INVENTION

The present invention relates to pedal box assemblies for motor vehicles and more particularly relates to an improved pedal box assembly having enhanced features which increase utility and versatility of the pedal box. More particularly the present invention provides a pedal box including a pedal adjustment mechanism which allows the pedals to be adjusted through multiple degrees of freedom so as to enable users to finely adjust pedal position and attitude. The invention further provides a pedal box assembly which is adaptable to a variety of vehicle floor geometries and means to enable fitting of the pedal box into a variety of vehicle types. More particularly the invention provides a pedal box assembly having adjustable anchor plates whose attitude maybe adjusted to accommodate a variety of floor surface angles including fitting on bulkheads, firewalls and frames.

BACKGROUND OF THE INVENTION/PRIOR ART

There are in existence a variety of pedal box assemblies used in motor vehicles. The pedal box assemblies normally include a brake, clutch and throttle pedal. In the known pedal boxes the construction is quite rigid with little or no ability to make fine adjustments to the pedals or to easily accommodate different vehicle floor surfaces. Current pedal boxes are not easily adaptable to differing vehicle contours such that there is no one size fits all design. As pedal boxes must be fitted to the floor surface of a vehicle the floor contour dictates what geometry is required for the base of the pedal box to enable proper fitting. As vehicle floor contours vary, a typical pedal box will not fit all vehicle floor surfaces.

In the past mounting pedal boxes effectively usually consisted of major modifications to the vehicle or pedal box or both. Achieving the required rigidity of the installation often involved the addition of supporting or strengthening materials in many race vehicles. Achieving the desired pedal lever positions usually consisted of remanufacturing and modifying of components. Achieving the desired pedal face positions was difficult and in many cases involved remanufacturing and modifying of components. Setting the desired pedal stroke often induced incorrect mechanical actions on respective master cylinders for the actuation of hydraulic circuits. Connections of the throttle, setting the stroke and setting the desired motion ratio often resulted in remanufacturing components. Plumbing the pedal boxes has been difficult due to the different nature of vehicles that they fit into. Space and location of components has differed for a variety of vehicle types. Additional components were required to be manufactured to complete the plumbing systems in many circumstances. Problems encountered in use of the current pedal boxes included the physical mounting of a pedal box to the vehicle, rigidity of the mounting, pedal lever positioning, pedal face positioning, throttle connection, throttle stroke, motion ratio of throttle, plumbing connections. A pedal box must be mounted to resist the forces applied by the drivers' feet. Some pedal boxes are floor mounted, using a small footprint mounting area to a flat floor area. These units require extreme floor rigidity which is to resist the moment forces from the drivers' feet. Usually a frame or other stiffening is required for reinforcing which adds unnecessary weight. Some pedal boxes are panel mounted. These units require fitting to a floor section and foot well panel combined. These units do not require additional stiffening due to the mounting being spread over a greater span.

The problem with this design is that the shape of the pedal box structure must match the shape of the vehicle floor and foot well to properly fit. This means that each vehicle may require a custom shaped pedal box to fit. Improved rigidity of the pedal box provides improved driver response and pedal feel. The rigidity of an installation relies on the mounting area and mounting span in the vehicle. The greater mounting span has a larger influence on rigidity than the mounting area does. The moments generated by the drivers' feet are resisted more effectively when increasing the supporting span. The installation of a pedal box can restrict the range of pedal lever positioning. In the case where a floor mount unit is fitted, the flat floor determines the longitudinal location and inclination of the pedal levers. The pedal levers may be adjusted slightly for comfort, but limited adjustment is available. Should the levers be adjusted outside the allowable limits, the mechanical system is compromised in its ability to efficiently transfer the input energy of the drivers' feet. In the case where a panel mount unit is fitted, the foot well shape determines the location and inclination of the pedal levers. Once this type of unit is fixed to the panels, the pedals and levers positions are generally predetermined thus not allowing adjustment to suit for driver comfort. The pedal faces positioning is generally limited or fixed in some prior art pedal boxes. In cases where the pedal face is adjustable, the positions available are limited to a single fixed plane which is in relation to the plane of the lever. Difficulty is encountered when the pedals do not allow the driver to have appropriate leverage or travel to operate the systems effectively.

An example of a known pedal box is disclosed in Patent specification DE 102007059376. This pedal box includes a flat base plate which includes openings which allow bolting of the pedal box to a floor surface. There is no facility in the invention disclosed in that patent to enable fitting of the assembly to other than a horizontal surface. There is no ability to alter the attitude to accommodate different floor contours. Nor is there an ability for the user accommodate vehicle floor surfaces disposed at different angles.

There is a long felt want in the industry to provide a pedal box assembly which is versatile enough to be adaptable to different vehicle floor geometries and which allows fine pedal adjustment to suit an individual driver. There is also a long felt want in the industry to provide further improvements in pedal assemblies by inclusion of a throttle adjustment which allows fine adjustment of throttle ratios.

SUMMARY OF THE INVENTION

With this in mind the invention provides according to one embodiment, a pedal box assembly which is adaptable to a variety of vehicle floor geometries and which includes connections to enable fitting of the pedal box into a variety of vehicle types. More particularly the present invention provides a pedal assembly including adjustable base mounting plates which pivot through a wide arc to enable the pedal assembly to be fitted to angled floor surfaces including bulkhead and firewalls. The present invention also provides a pedal box assembly for motor vehicles and which includes a pedal adjustment mechanism which allows the pedals to be adjusted through multiple degrees of freedom so as to enable users to finely adjust pedal position and attitude. The present invention seeks to ameliorate the problems of the prior art systems by providing an alternative method and assembly for fitting and adjusting pedal boxes to accommodate a wide variety of floor geometries. The present invention seeks to provide a useful alternative to the known pedal boxes systems to increase versatility of installation and also to allow pedal adjustment through additional degrees of freedom and throttle control adjustment. The term "vehicle" will hereinafter be used to refer generally to any land-based vehicle, including but not limited to cars, trucks, plant and equipment and buses, however, for purposes of illustration, the most common circumstance in which pedal boxes of the type described are used are sports vehicles such as racing cars. That will be used to illustrate the pedal box assembly. Plate may be taken to mean a generally planar flat or curved surface which is capable of engagement with another member.

In its broadest form the present invention comprises: a pedal box comprising a brake assembly, clutch assembly and throttle assembly each mounted on an axis supported by a first mounting plate; a master cylinder operatively connected to each said brake assembly and clutch assembly; characterized in that said brake assembly, clutch assembly and throttle assembly each comprise a pedal which is adjustable vertically horizontally and rotationally relative to a support member.

In its broadest form the present invention comprises: a pedal box for a vehicle comprising at least one of a brake assembly, clutch assembly and throttle assembly each mounted on an axis supported by a first mounting plate; a master cylinder operatively connected to each said brake assembly and clutch assembly; characterized in that said pedal box assembly, includes at least one articulating mounting member which allows the pedal box assembly to accommodate a variety of vehicle floor geometries.

In another broad form the present invention comprises; a pedal box comprising a brake assembly, clutch assembly and throttle assembly each mounted on an axis supported by a first mounting plate; a master cylinder operatively connected to each said brake assembly and clutch assembly; characterized in that said pedal box assembly, includes articulating mounting plates which allow an operator to mount the pedal assembly to a variety of vehicle floor shapes. The floor shapes include a firewall or frame.

According to a preferred embodiment each pedal comprises a plate and extending therefrom at least one connector plate which engages a support bracket. The connector and support bracket co-operate to enable the connector plate to move relative to the support bracket rotationally horizontally and vertically. Pedal box assembly further comprises a second mounting plate which is pivotally attached thereby allowing rotation through a wide arc of at least 270 degrees so that the second mounting plate can be adjusted to conform to the attitude of a support surface in the vehicle. Preferably each pedal is attached to a support member via engaging plates including slots which allows a bolt to anchor the plates but allowing selective sliding and rotational movement of the pedals to find a suitable attitude for a user.

In another broad form the present invention comprises: a pedal box for a vehicle comprising a brake assembly, clutch assembly and throttle assembly each mounted on an axis supported by a first mounting plate; a master cylinder operatively connected to each said brake assembly and clutch assembly; characterized in that said pedal box assembly includes a pedal assembly on at least one of the clutch, brake and throttle assemblies; the pedal assembly comprising a pedal whose attitude is adjustable relative to a supporting strut, vertically and rotationally.

In another broad form the present invention comprises; A pedal box for a vehicle comprising a brake assembly, clutch assembly and throttle assembly each mounted on an axis supported by a first mounting plate; a master cylinder operatively connected to each said brake assembly and clutch assembly; characterized in that said pedal box assembly includes a throttle response adjustment assembly.

In another broad form of a method aspect the present invention comprises:
a method for fitting a pedal box to a floor surface of a vehicle the pedal box comprising a clutch assembly, brake assembly and throttle assembly each mounted on an axis supported by a first mounting plate; master cylinders operatively connected to each said brake assembly and clutch assembly; the pedal box assembly, including articulating mounting plates which allow an operator to mount the pedal assembly to a variety of vehicle floor shapes; the method comprising the steps of:
 a) setting a first anchor plate at an attitude which aligns with a first portion of floor surface in the vehicle;
 b) setting a second anchor plate at an attitude which aligns with a second portion of a floor surface in the vehicle; and
 c) fastening said first and second plates to said floor surface portions to secure the pedal box in position.

The present invention provides an alternative to the known prior art and the shortcomings identified. Other objects and advantages will appear from the description to follow. In the description reference is made to the accompanying drawings and illustrations, which forms a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the invention. In the accompanying illustrations, like reference characters designate the same or similar parts throughout the several views. The following detailed description is, therefore, not to be taken as limiting the scope of the present invention.

BRIEF DESCRIPTION OF DRAWINGS

The present invention will now be described according to a preferred but non limiting embodiment and with reference to the accompanying illustrations wherein.

The apparatus of the invention utilizes some conventional components and the invention resides in the combination of these conventional components and the manner of use thereof. Hence, any conventional materials and designs of the individual components are acceptable to the present invention so long as the materials and designs function in the manner described.

DETAILED DESCRIPTION

Although the invention will be described with reference to its application in racing vehicles it will be appreciated that the assembly and method to be described, will have other applications in a variety of vehicles. The present invention to be discussed below with reference to particular embodiments, addresses the problems of adjustment and retrofitting and provides a useful alternative to the known pedal boxes. Throughout the specification a reference to a pedal box can be taken to be a reference to an assembly which includes a support structure having at least one operating pedal.

Figure 1:
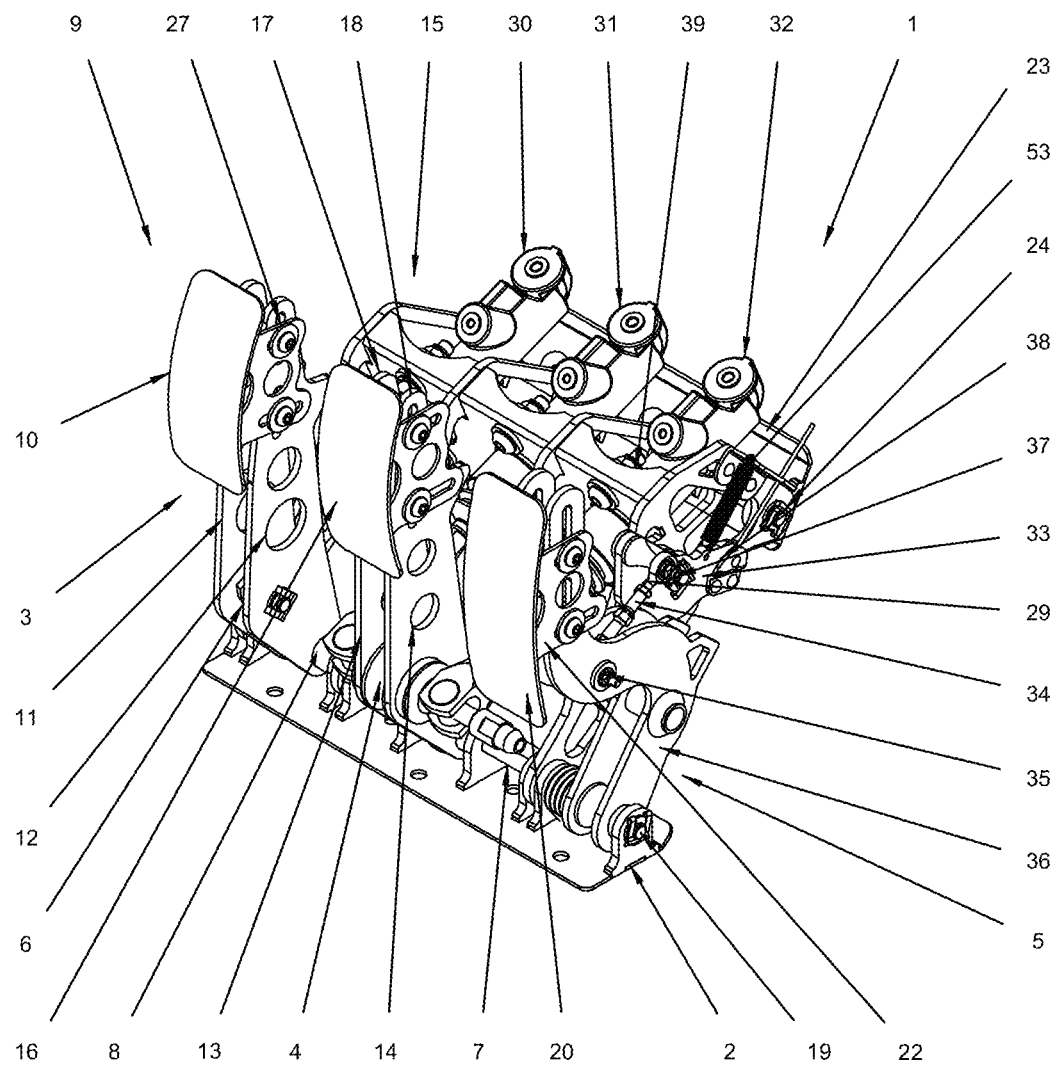
FIG. 1 shows a front perspective view of a pedal box assembly according to a preferred embodiment.

Referring to FIG. 1 there is shown a front perspective view of a pedal box assembly 1 according to a preferred embodiment. Pedal box 1 comprises a base plate 2 from which extends a clutch pedal assembly 3, a brake pedal assembly 4 and a throttle pedal assembly 5. Clutch pedal assembly 3 includes a bracket assembly 6 which engages shaft 7 via pivot 8. Bracket assembly 6 at end 9 receives and retains a clutch pedal 10 which attaches via mounting brackets 11 and 12 to shaft 7. Likewise brackets 13 and 14 receive and retain at end 15 a brake pedal 16 which attaches via mounting brackets 17 and 18. Throttle pedal assembly 5 is retained on shaft 7 via pivot 19. Throttle pedal assembly 5 includes throttle pedal 20 which is mounted via adjustable mounting brackets 21 (obscured) and 22 which retains pedal 20. Base plate 2 is typically mounted on the floor of a vehicle via screw or bolt fasteners (not shown). Pedal box assembly 1 further comprises a second mounting plate 23 which is pivotally attached via pivot connection 24 thereby allowing rotation through a wide arc so that the second mounting plate 23 can be adjusted to conform to the attitude of a support surface in the vehicle (see FIGS. 7 and 8). Pedal Box 1 further comprises master cylinder 30 which operates clutch pedal assembly 3 and hydraulic cylinders 31 and 32 which operate brake pedal assembly 4. Throttle pedal assembly 5 includes a throttle adjustment assembly which comprises a linkage rod 34 connected via connector 35 to strut 36. Linkage arm/rod 34 allows adjustment of the throttle linkage geometry to achieve a desired throttle cable stroke travel and motion ratio. Setting the correct throttle travel is vital to the performance of the vehicle engine. Throttle travel can be adjusted so that the engine throttle fully opens without straining the cable or linkage. The adjustable linkage 34 includes a threaded sleeve which allows fine adjustment of the throttle response time and range provided by co-operating members linkage 34 and rocker arm 38 provide adjustment. The throttle adjustment assembly allows fine adjustment of the throttle to alter response during travel of the throttle pedal 20. Link arm 34 has a first end connected intermediate the throttle pedal strut 36 and a second end which is retained by a rocker arm 38. Link arm 34 is adjustable and capable of extension and retraction. Rocker arm 38 is pivotally mounted on support frame 39. A second end of the rocker arm 38 engages a first end of a return spring 53 which is retained by a bracket mounted to said support frame 39. Link arm 34 includes a threaded member 29 which when rotated extends and retracts said link arm. When the threaded member 29 of the link arm 34 is rotated in a first direction the responsiveness of the throttle pedal is reduced over at least part of its full range of travel. When the threaded member 29 of the link arm 38 is rotated in a second direction the responsiveness of the throttle pedal 20 is increased over at least part of its full range of travel. When the threaded member 29 of the link arm 38 is rotated in a direction which extends the link arm to a maximum extent, the throttle is most effective towards the end of its range of travel. When the threaded member 29 of the link arm 34 is rotated in a direction which reduces the link arm 34 to a minimum extent, the throttle is most effective towards the beginning of its range of travel. The threaded member 29 allows setting of the link arm 34 at a length anywhere between maximum and minimum. The link arm allows fine adjustment of throttle linkage stroke and throttle motion ratio. Spring 53 returns the throttle when relieved.

There is a recommended trial fitting order for installation of the pedal box 1. Preferably the throttle linkage stroke and throttle motion ratio are set using link arm 34. Preferred the following fitting steps are adopted. Firstly the remote reservoirs and hoses are set. Then the clutch lever position is set, along with stroke adjustment and stop position. The Brake bias bar, Brake lever position, stroke adjustment and stop position are all set preferably in that order. Then plumbing to master cylinders is fitted followed by adjustment of remote bias cable and pedal adjustment to ensure comfort. Once the adjustments have been made, the master cylinders may be removed to mark mounting holes in plates 2 and 23 which are drilled to suit selected fasteners.

Figure 2:
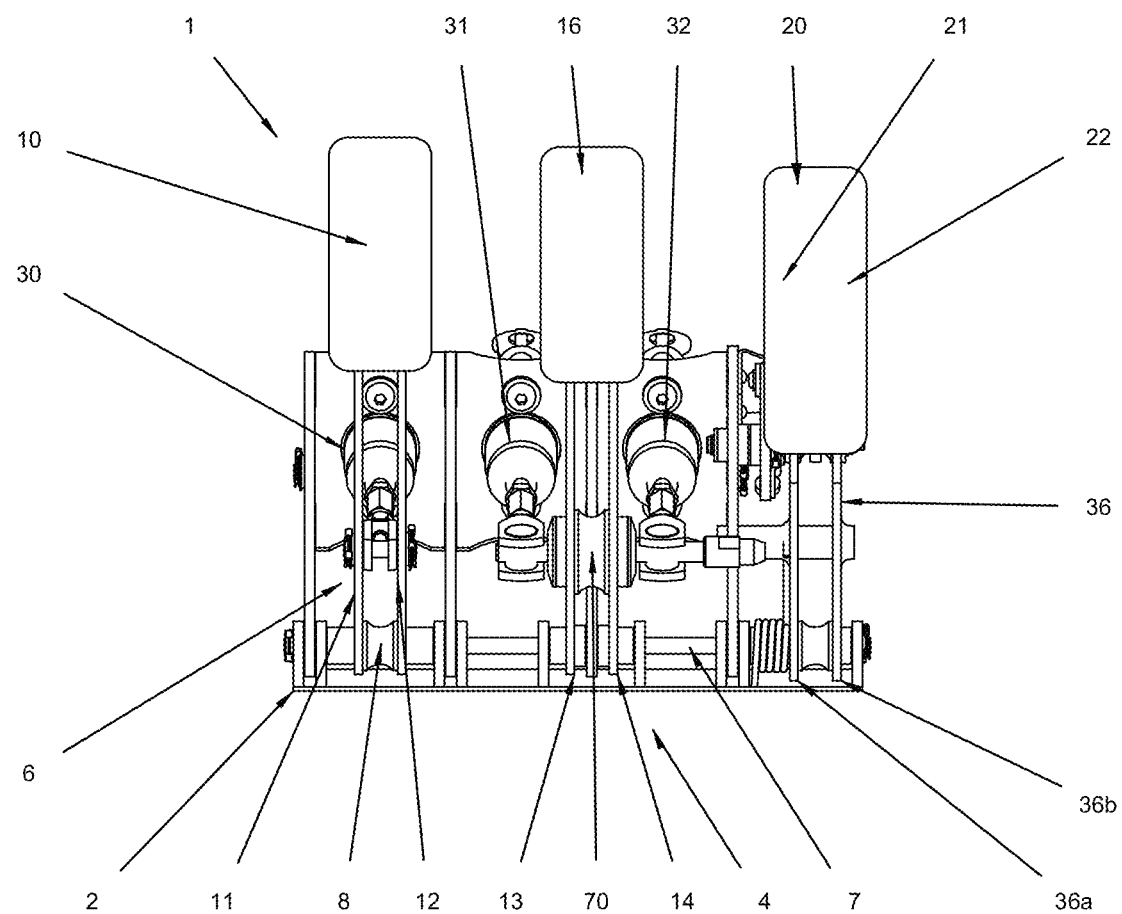
FIG. 2 shows a front view of the assembly of FIG. 1.
Figure 3:
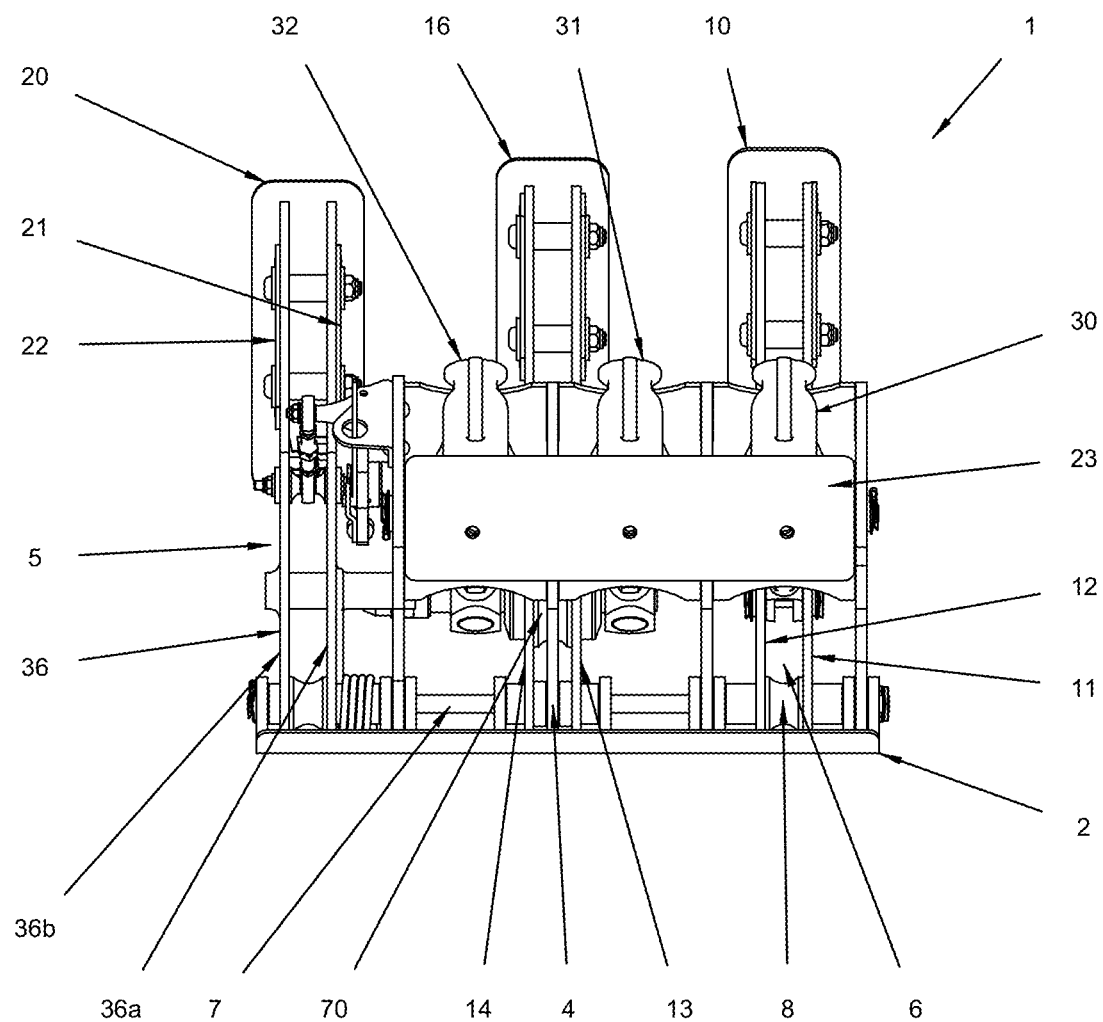
FIG. 3 shows with corresponding numbering a rear view of the pedal box assembly 1 of FIG. 2.
Figure 4:
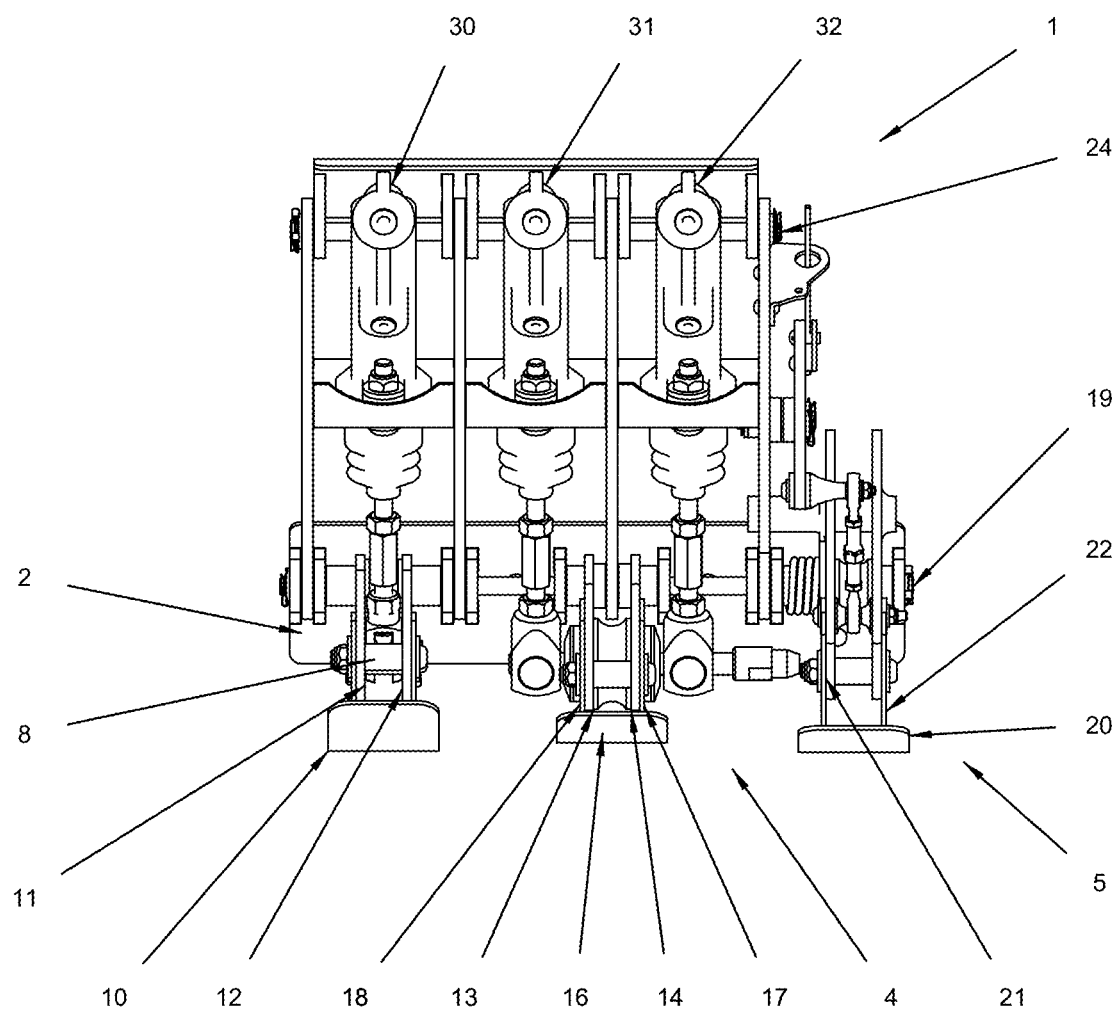
FIG. 4 shows with corresponding numbering a top view of the pedal box assembly 1 of FIG. 2.

FIG. 2 shows with corresponding numbering a front view of the pedal box assembly 1 of FIG. 1. A pivoted balance bar 70 to separate master cylinders 31 and 32 delivers braking force to front and rear brakes. Throttle support strut 36 is shown comprising separate elements 36a and 36b. FIG. 3 shows with corresponding numbering a rear view of the pedal box assembly 1 of FIG. 2. FIG. 4 shows with corresponding numbering a top view of the pedal box assembly 1 of FIG. 2.

Figure 5:
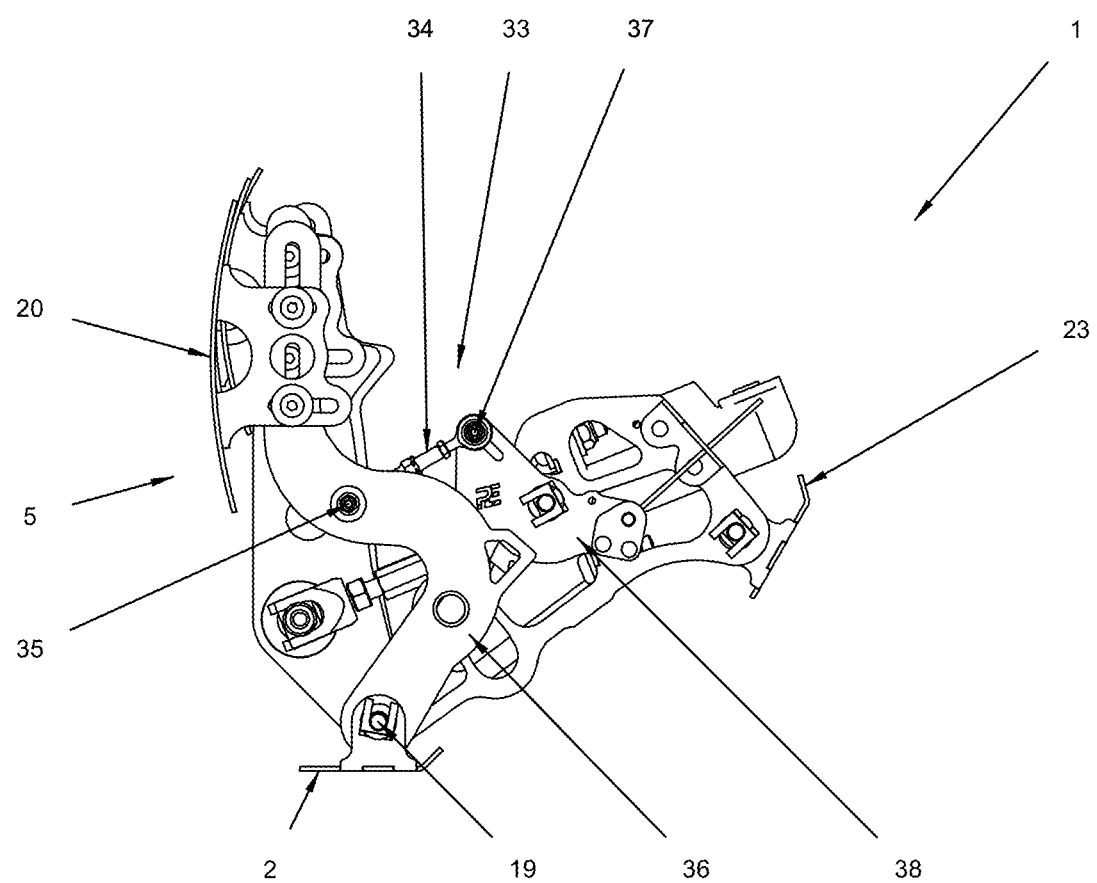
FIG. 5 shows a side elevation view of the pedal box assembly of FIG. 1.

FIG. 5 shows a side elevation view of the pedal box assembly 1 of FIG. 1 showing throttle assembly 5 and its associated throttle linkage assembly 33. From this view it may be seen that plate 2 is disposed horizontally for engagement of a vehicle floor surface. Plate 2 pivots about shaft 7 allowing rotational movement through a range up to 270 degrees. Second mounting plate 23 may also be rotated through a range of about 90 degrees to enable engagement with an inclined surface or a stepped surface. The inclined surface may for instance be a vehicle firewall. Connected to throttle assembly 5 is a throttle linkage assembly 33. Throttle linkage assembly 33 includes link member 34 having a first end pivotally connected via pivot 35 to support member 36 and a second end pivotally connected via pivot 37 to transfer arm 38. Pivot connection 37 is adjustable to enable alteration of travel of throttle pedal 20 to adjust travel response between a rest and fully deployed position.

Figure 6:
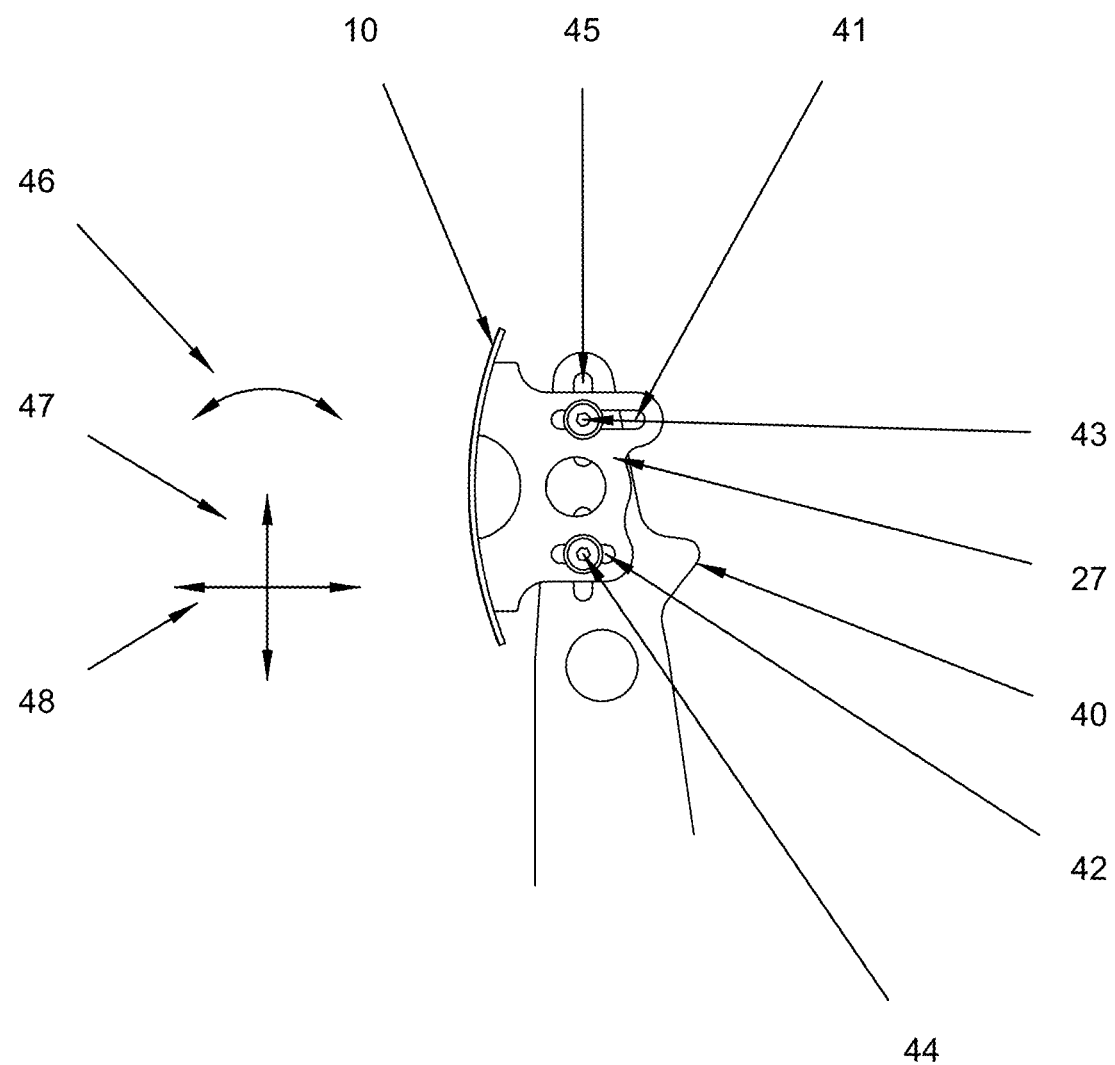
FIG. 6 shows an enlarged side elevation of the adjustable pedal mechanism.

FIG. 6 shows an enlarged side elevation of the adjustment mechanism for clutch pedal 10. Clutch pedal 10 is connected to mounting bracket 26 (obscured) and mounting bracket 27. Mounting bracket 12 is attached to support member 40. Bracket 27 includes slots 41 and 42 which receive connecting bolts 43 and 44 Bolts 43 and 44 also respectively engage slots 45 and 46. This arrangement allows relative movement between plate 27. Specifically, pedal 10 can be adjusted rotationally in the directions indicated by arrow 46, vertically as indicated by arrow 47 and horizontally as indicated by arrow 48. Any combination of the aforesaid movements can be combined to finely adjust the clutch pedal 10. Similar attitude adjustments are available for brake pedal 16 and throttle pedal 20 (see FIG. 1). Plate 26 which is obscured in FIG. 5 is a mirror image of plate 27 and operates in the same manner to that described for plate 12. The pedal face position is adjusted to suit using the slots provided. The adjustment bolts should always have large diameter washers at both faces and have the crush tubes in place. The pedals 10, 16 and 20 may be moved up/down, in/out or pitched about the vertical position using the slots provided to suit the particular installation.

Adjustable pedal geometry is important for driver feel and comfort. The pedal positions can be adjusted using the adjustment slots described above. The proper pedal positioning is highly dependent on driver preferences. The stroke of the clutch and brake levers is set by adjusting the length of the pushrods of the .master cylinders 30, 31 and 32. The brake lever should act on the maximum possible comfortable stroke to increase the available and mechanical advantage and travel in emergencies. In all cases, ensure that the cylinders do not bottom out before their respective in built pedal stop positions. The pedals are set so that the driver is comfortable and safe. Mechanical advantage, commonly termed as pedal ratios on this assembly can be adjusted by moving the pedal face up or down using the slots provided.

The desired stroke of the brake pedal 16 can be adjusted by adjusting the pushrod length. Most racing clutch and release bearings require the use of a clutch stop to eliminate over travel. Setting this stop correctly will prevent any unnecessary damage to the clutch and allow the clutch to release cleanly. The clutch stop setting should be a little past the point of clear clutch release (around 4-8 mm measured at the pedal face). Care should be taken, because over travel on the clutch may cause damage. The clutch lever arm has an inbuilt stop position. The rod length can be adjusted to correct the fluid displaced in cylinder 30. Alternatively a designer may change to a different master cylinder bore size to achieve the correct fluid displacement for a user desired clutch pedal travel range.

Figure 7:
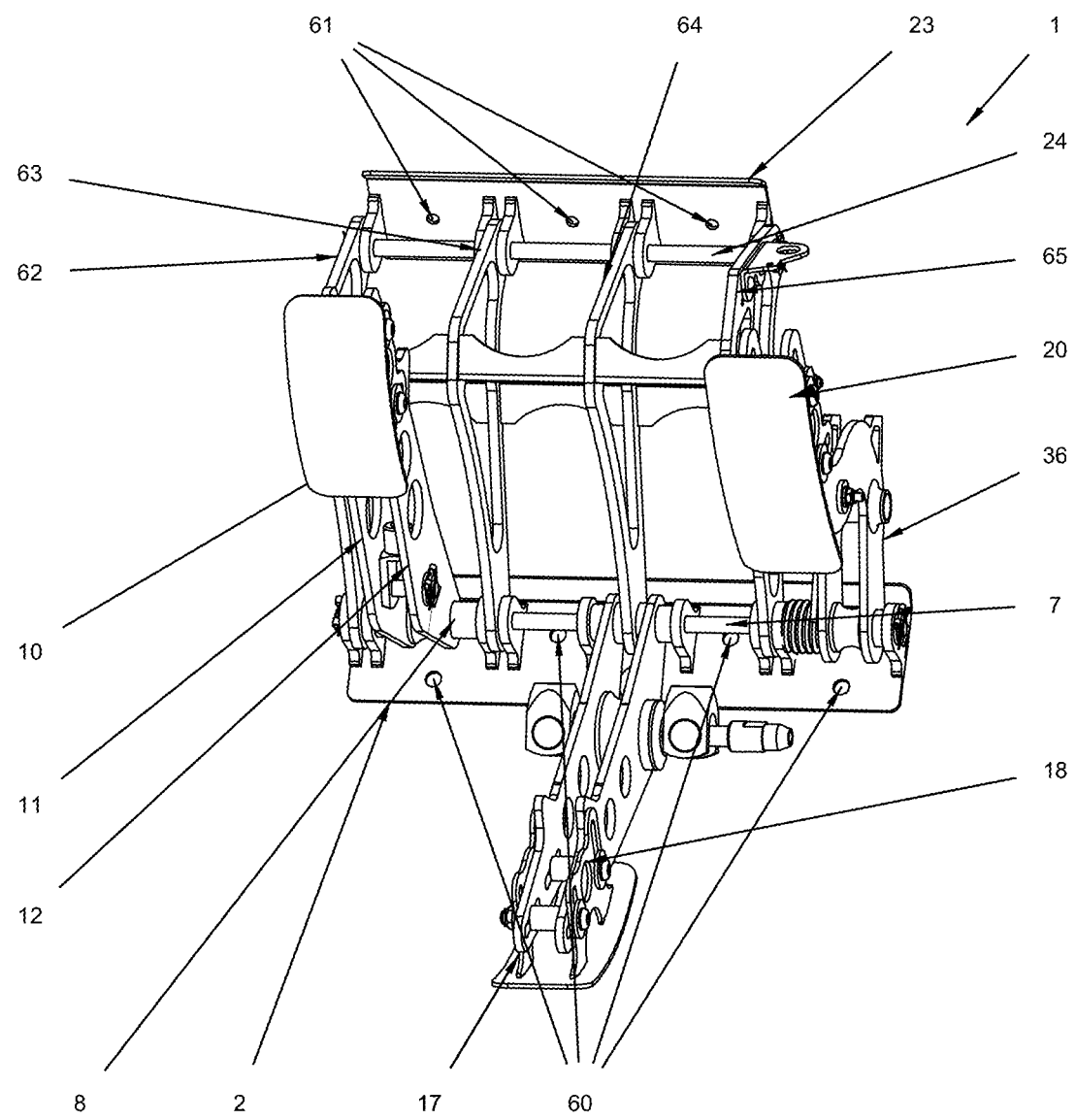
FIG. 7 shows an abbreviated perspective view of the pedal assembly with top and bottom adjustable attachment plates and the brake assembly rotated away for clarity.

FIG. 7 shows a further perspective abbreviated perspective view of the pedal assembly 1 with top and bottom adjustable attachment plates. In this case the brake pedal assembly 4 is rotated away but held by shaft 7. Mounting of the pedal box 1 requires the use of high quality fine thread self-locking fasteners inserted in openings 60 for plate 2 and openings 61 for plate 23 at the suggested locations with large diameter washers to both sides. Proper mounting is achieved by providing an adequate spread of fasteners (not shown) to plate 2 and fasteners which anchor to plate 23 via openings 61. The minimum suggested fixings are 4× M8 fasteners to the lower flange and 3× M6 fasteners to upper flange. An increase in size of fixings increases strength and safety of the fixation and can be adopted as required in each case. Master cylinders 30 and 31 can be removed to access the mounting openings 60 for plate 2 and 61 for plate 23. Also the clutch and/or brake pedals 10 and 16 may be rotated away to increase access to the mounting openings 60. Brake pedal 16 is shown rotated away from its working position which facilitates access to fixation openings 60 and 61 respectively for plates 2 and 23.

It is very important that the pedal assemblies 3 (clutch), 4 (brake) and 5 (throttle) are mounted securely to an adequate frame or panel. Increased rigidity provides increased accuracy, control and pedal feel by the driver. The mounting is required to resist the loads of a driver's legs in panic situations, typically 80-130 kg combined on the clutch and brake pedals. Together these loads are required to be withstood by the vehicle structure and the method of attachment to the vehicle. Pedal levers, pedal faces and pushrod adjustments may be needed to achieve a comfortable position while selecting a preferred mounting location and incline angle. If further adjustments are required, the adjustments can be temporarily completed prior to permanent mounting. Multiple mounting holes in two plates 2 and 23 mounted on the vehicle enable easy longitudinal adjustments, allowing the entire pedal assembly to be moved fore and aft to suit different drivers. The lower plate 2 and upper plate 23 support the pedal assembly, spread the loads and thus decrease any concentrated loads to vehicle panels when installed. Clutch pedal 10 is mounted to shaft 8 between support frames 62 and 63. Brake pedal plates 17 and 18 are disposed either side of support frame 64. Throttle pedal 20 operates outside support frame 65. Support frames 62, 63, 64 and 65 engage and are retained by axle 24 at a distal end and by axle 7 at a proximal end.

The faces of pedals 10, 16 and 20 should preferably be disposed vertically or leaning slightly towards the driver. The driver should not be stretching toes to reach this pedal position and their knees should be slightly bent. The optimal throttle pedal 20 position is to have it even with the brake pedal 16 while the brake pedal is in the depressed position. This allows a driver to quickly change back to the throttle pedal 20 after braking.

Figure 8:
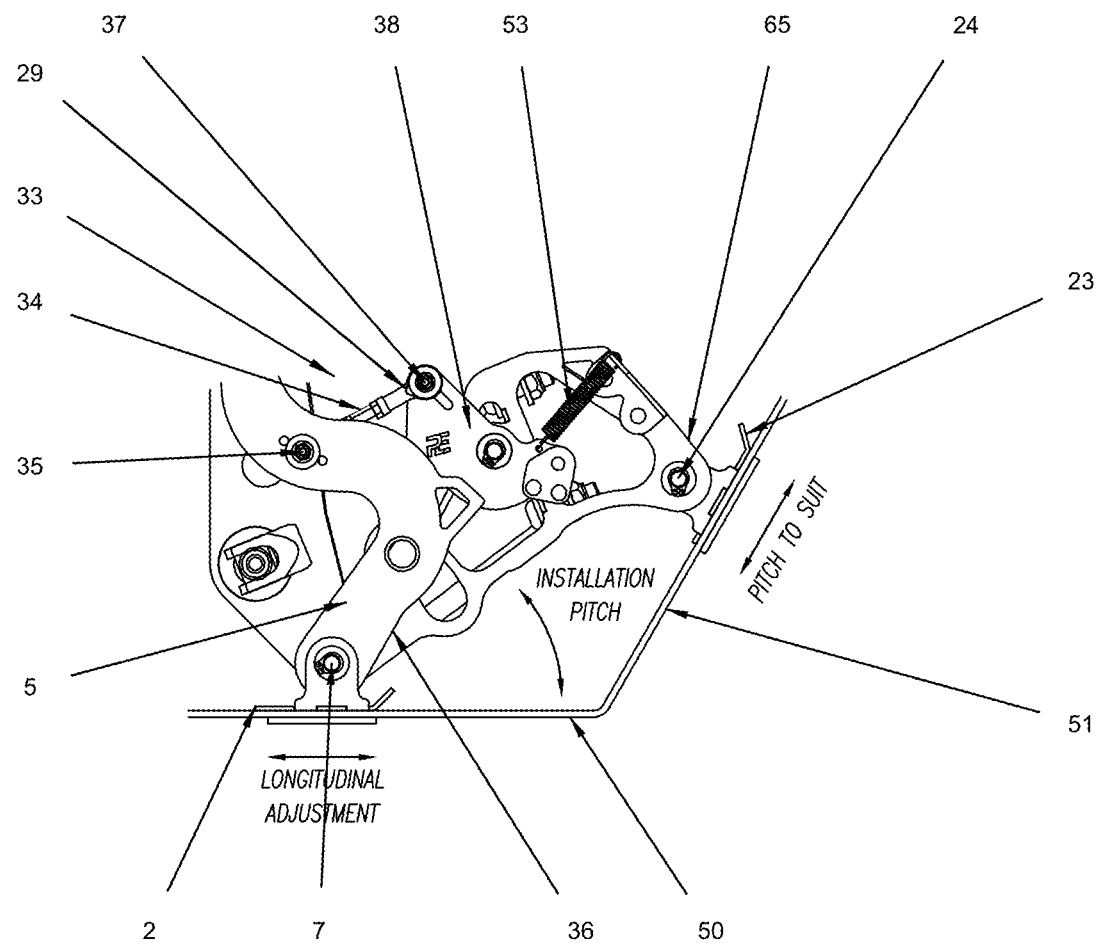
FIG. 8 shows a part side elevation view of the pedal box assembly indicating relative positions of attachment plates according to one embodiment.
Figure 9:
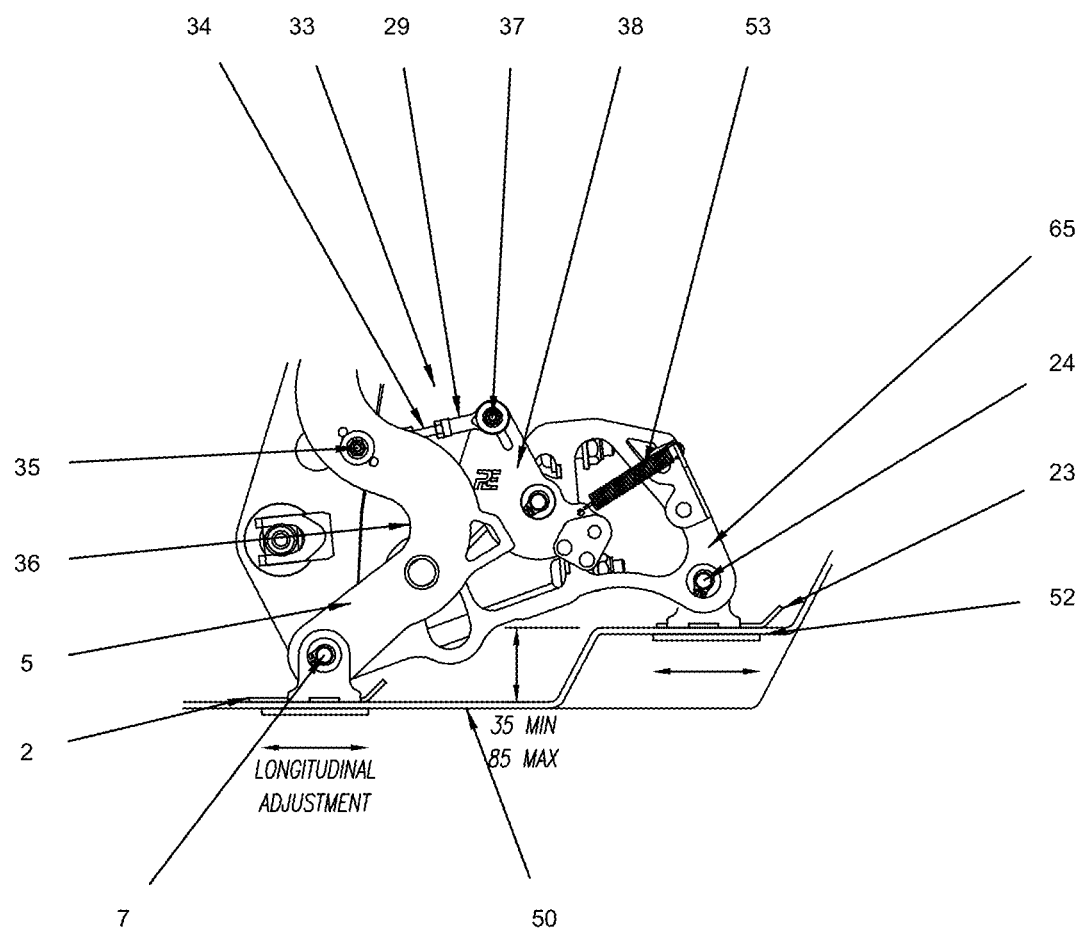
FIG. 9 shows a part side elevation view of the pedal box assembly indicating relative positions of attachment plates according to an alternative embodiment.

FIG. 8 shows a part side elevation view of the pedal box assembly 1 indicating relative positions of attachment plates 2 and 23 according to one embodiment. FIG. 9 shows a part side elevation view of the pedal box assembly 1 indicating relative positions of attachment plates 2 and 23 according to an alternative embodiment.

FIG. 8 shows plate 2 is disposed horizontally for engagement with a vehicle floor surface 50. Plate 2 pivots about shaft 7 allowing rotational movement of plate 2 so it orientates with floor 50. Second mounting plate 23 may also be rotated to enable engagement with an inclined surface 51.

FIG. 9 shows a part side elevation view of the pedal box assembly 1 indicating relative positions of attachment plates 50 and 23 according to an alternative embodiment. Plate 2 is in this embodiment disposed horizontally for engagement of vehicle floor surface 50. Plate 2 pivots about shaft 7 allowing rotational movement of plate 2 so it orientates with floor 50. Second mounting plate 23 may also be rotated to enable engagement with a stepped surface 52. A rod 34 allows adjustment of the throttle linkage geometry to achieve a desired throttle cable stroke travel and motion ratio. Setting the correct throttle travel is vital to the performance of the vehicle engine. Throttle travel can be adjusted so that the engine throttle fully opens without straining the cable or linkage. The adjustable linkage provided by co-operating members 34 and rocker 38 provides throttle adjustment. Spring 53 returns the throttle when relieved.

Figure 10:
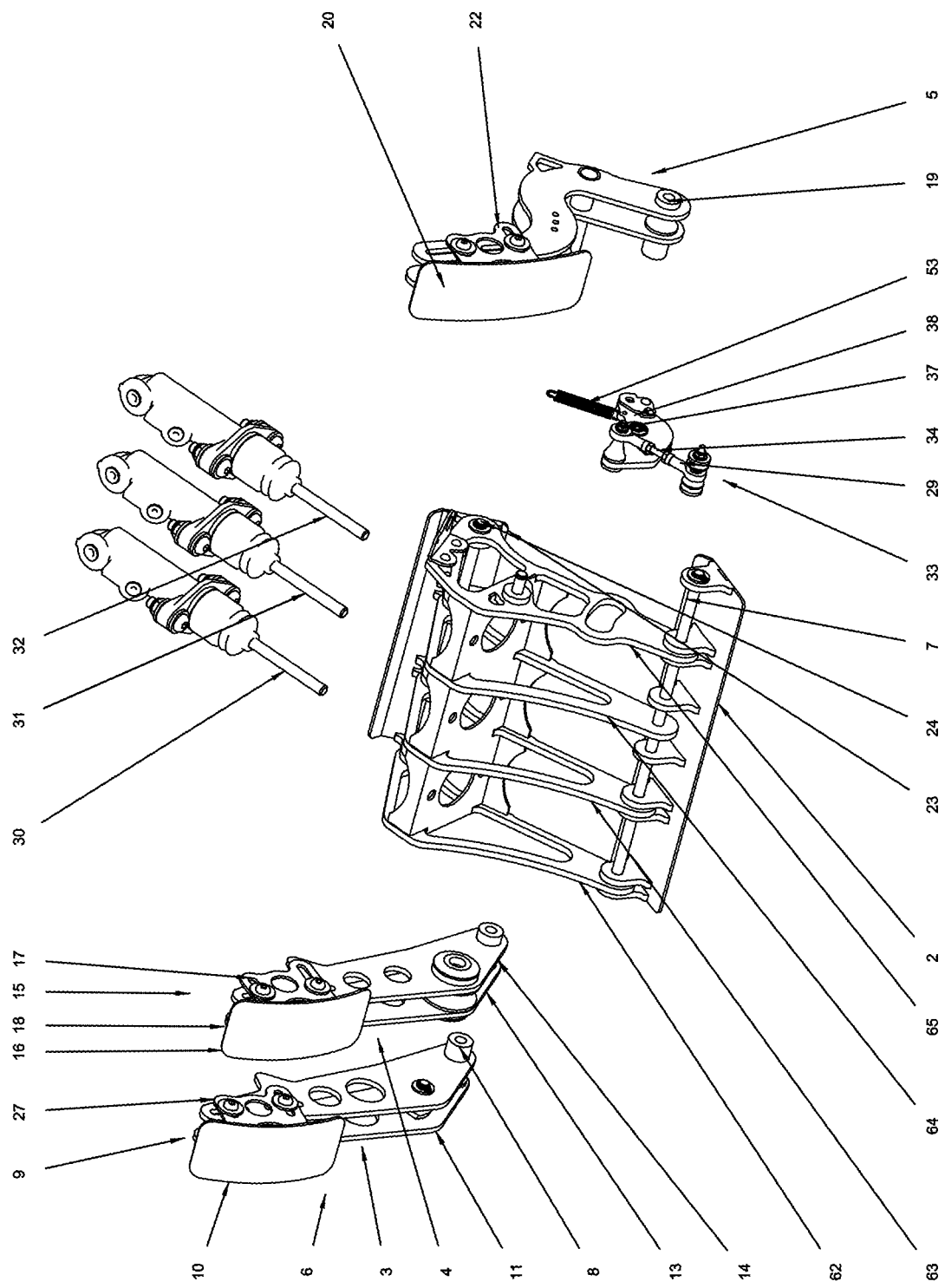
FIG. 10 shows an exploded view of the pedal box assembly of FIG. 1 showing the main components.

FIG. 10 shows with corresponding numbering an exploded view of the pedal box assembly 1 showing the main components. Base plate 2 supports shaft 7 from which extends a clutch pedal assembly 3, a brake pedal assembly 4 and a throttle pedal assembly 5. Clutch pedal assembly 3 includes a bracket assembly 6 which engages shaft 7 via pivot 8. Bracket assembly 6 at end 9 receives and retains a clutch pedal 10 which attaches via mounting plates 26 (obscured) and 27 which engage mounting brackets 11 and 12 to shaft 7. Likewise, brackets 13 and 14 receive and retain at end 15 a brake pedal 16 which attaches via mounting plates 17 and 18. Throttle pedal assembly 5 is retained on shaft 7 via pivot 19. Throttle pedal assembly 5 includes throttle pedal 20 which is mounted via adjustable mounting brackets 21 (obscured) and 22 which retains pedal 20. Base plate 2 is typically mounted on the floor of a vehicle via screw or bolt fasteners (not shown). Pedal box assembly 1 further comprises a second mounting plate 23 which is pivotally attached via pivot connection 24 thereby allowing rotation through a wide arc of at least 90 degrees so that the second mounting plate 23 can be adjusted to conform to the attitude of a support surface in the vehicle (see FIGS. 7 and 8). Pedal Box 1 further comprises master cylinders 30, 31 and 32 which respectively are operatively connected to brake pedal assembly 3, clutch pedal assembly 4 and throttle pedal assembly 5.

Figure 11:
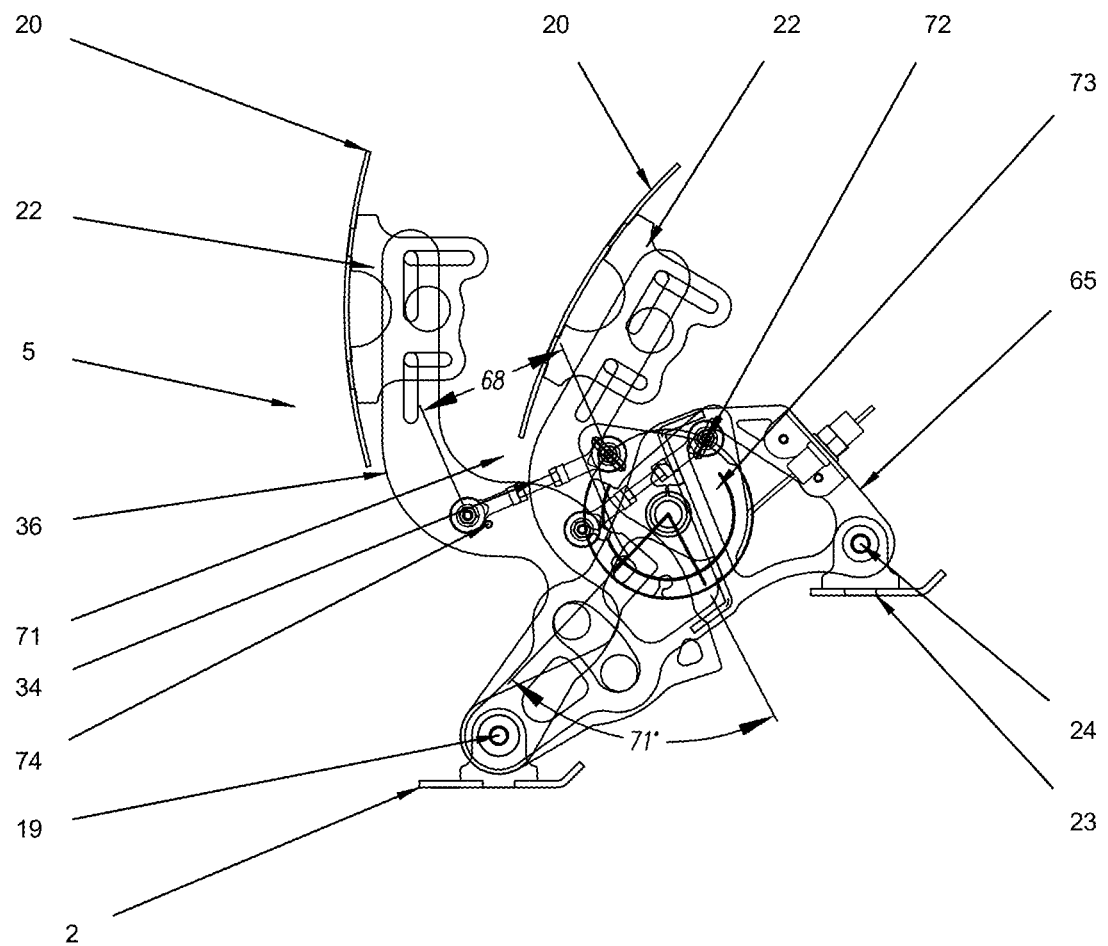
FIG. 11 shows a side elevation of a pedal box assembly with an alternative throttle adjustment mechanism.

FIG. 11 shows with corresponding numbering a side elevation of pedal box assembly 1 with an alternative throttle adjustment mechanism 71. Assembly 1 is the same as described earlier but in this case the throttle adjustment mechanism 71 incorporates an alternative rocker arm and additional openings 74 for adjustment of the position of the link arm 34. Mechanism 71 comprises a link arm 34 which is essentially the same as that described earlier with reference to FIGS. 8 and 9. Link arm 34 engages rocker 73 via pivot connection 72. Rocker is connected to support frame 65 via a pivot connection. Throttle support strut 36 according to this embodiment includes three openings 74 which allows positional adjustment of link arm 34. This in addition to the ability to adjustment the length of link arm 34 provides a more versatile adjustment of the travel and to the throttle responsiveness. In this embodiment, for a link arm length of 68 mm the rocker 73 during depression of the throttle pedal 20 defines an arc of 71 degrees.

Figure 12:
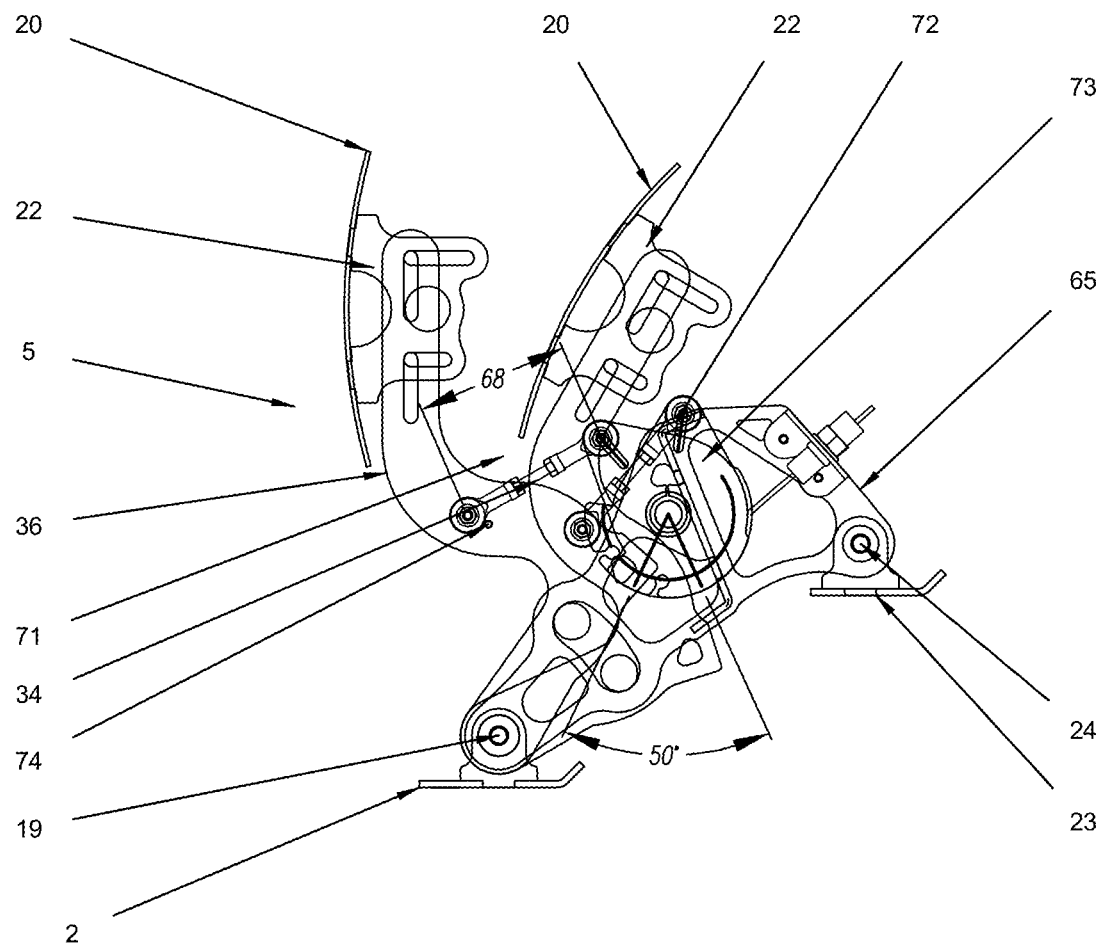
FIG. 12 shows the pedal box assembly of FIG. 11 with throttle pedal advanced.

FIG. 12 shows the pedal box assembly of FIG. 11 with throttle pedal 20 defining a smaller arc of 50.1 degrees. Arm 34 can be adjusted in two ways. Firstly it can be set in one of the three openings 74 in strut 36. Secondly it may be adjusted by rotation of a threaded sleeve which increases or decreases the length of the arm 34. In this way, for a given linkage arm length an arc of rotation can be selected for the throttle rocker 73 which impacts on the response time, duration of response of the throttle. Also the throttle mechanism 71 can be adjusted so that it is responsive early in the arc of rotation or more responsive towards the end of the arc of rotation.

Figure 13:
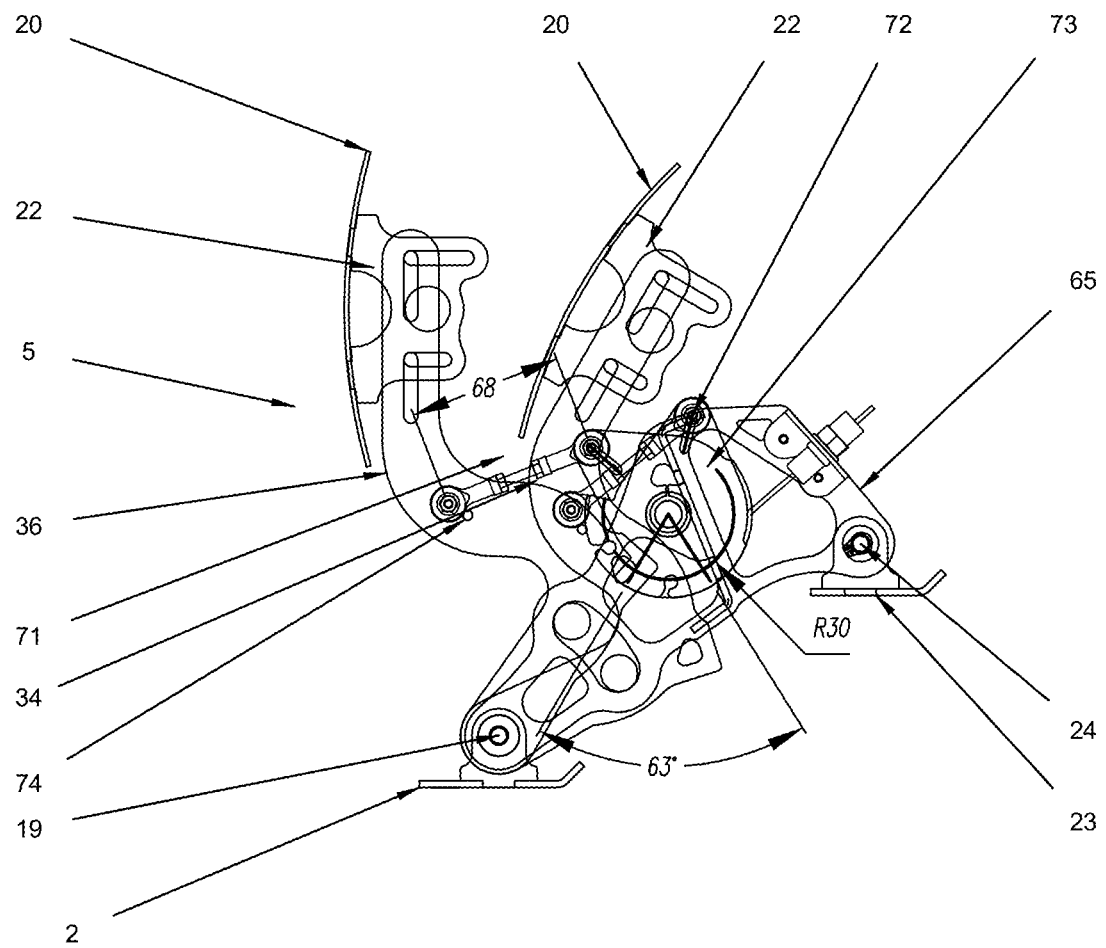
FIG. 13 shows with corresponding numbering a side elevation of pedal box assembly with an alternative throttle adjustment mechanism geometry.
Figure 14:
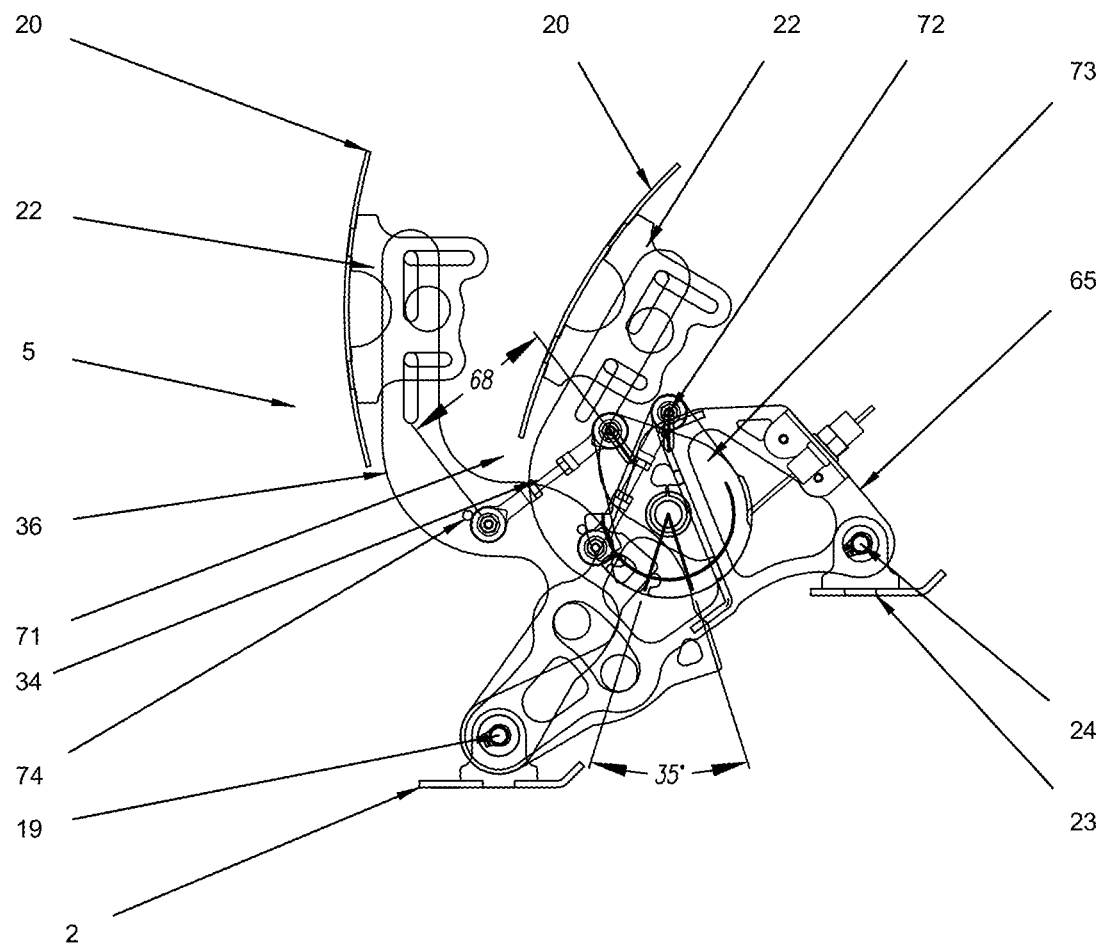
FIG. 14 shows the pedal box assembly with link arm relocated to the opening nearest to the end terminating in the support plate.

FIG. 13 shows with corresponding numbering a side elevation of pedal box assembly 1 with an alternative throttle adjustment mechanism geometry. It will be noted that link arm 34 has been shifted from the centre opening of openings 74 to the opening closer to the pedal 20. Link arm is shown as 68 mm and the rocker 73 defines an arc of 62.9 degrees. In FIG. 14 link arm 34 has been relocated to the opening 74 nearest to the end terminating in support plate 2. Rocker arm in this arrangement defines an arc of 35.1.

Figure 15:
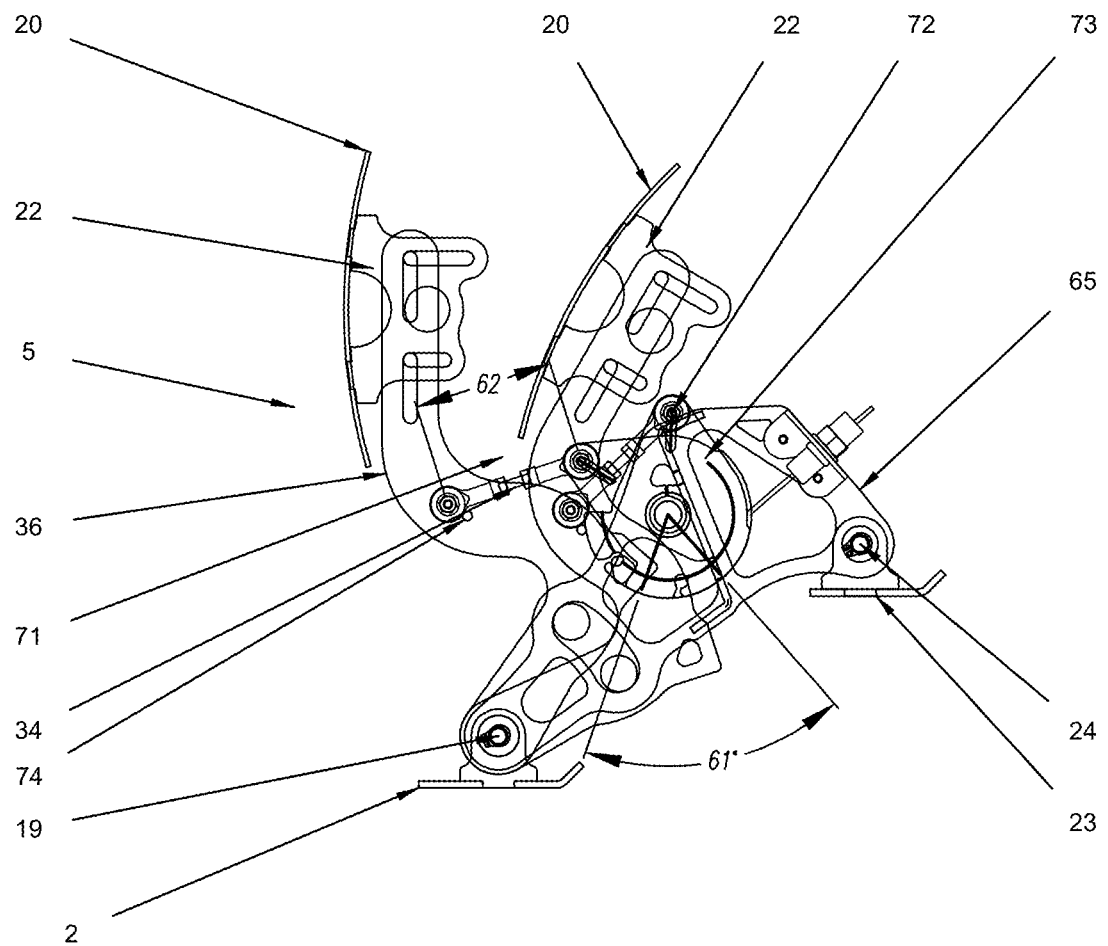
FIG. 15 shows with corresponding numbering a side elevation of pedal box assembly with an alternative throttle adjustment mechanism geometry with the link arm shifted from the centre opening to the opening closer to the pedal.
Figure 16:
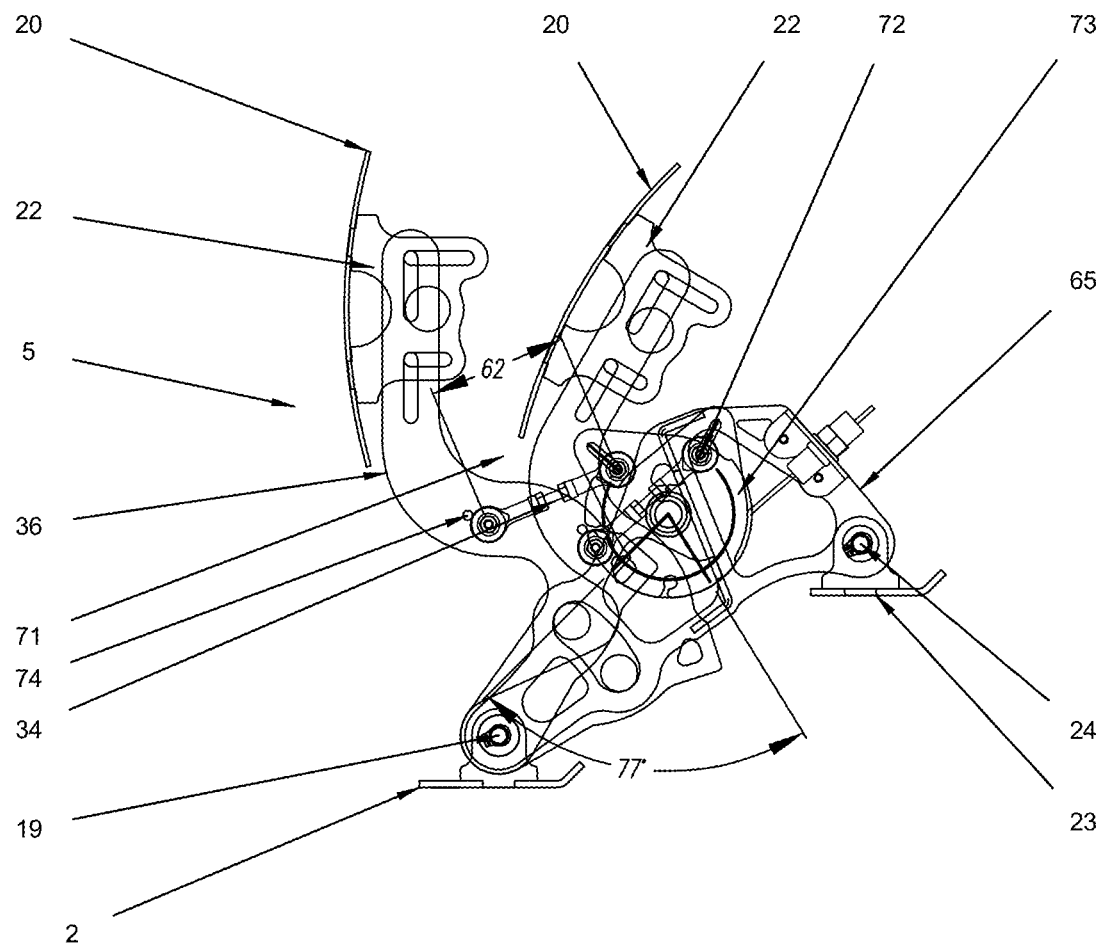
FIG. 16 shows link arm has been relocated to the opening nearest to the end terminating in support plate and with rocker arm defining an alternative arc.

FIG. 15 shows with corresponding numbering a side elevation of pedal box assembly 1 with an alternative throttle adjustment mechanism geometry. It will be noted that link arm 34 has been shifted from the centre opening of openings 74 to the opening closer to the pedal 20. Link arm is shown as 62 mm and the rocker 73 defines an arc of 60.5 degrees. In FIG. 16 link arm 34 has been relocated to the opening 74 nearest to the end terminating in support plate 2. Rocker arm in this arrangement defines an arc of 76.7 degrees.

Figure 17:
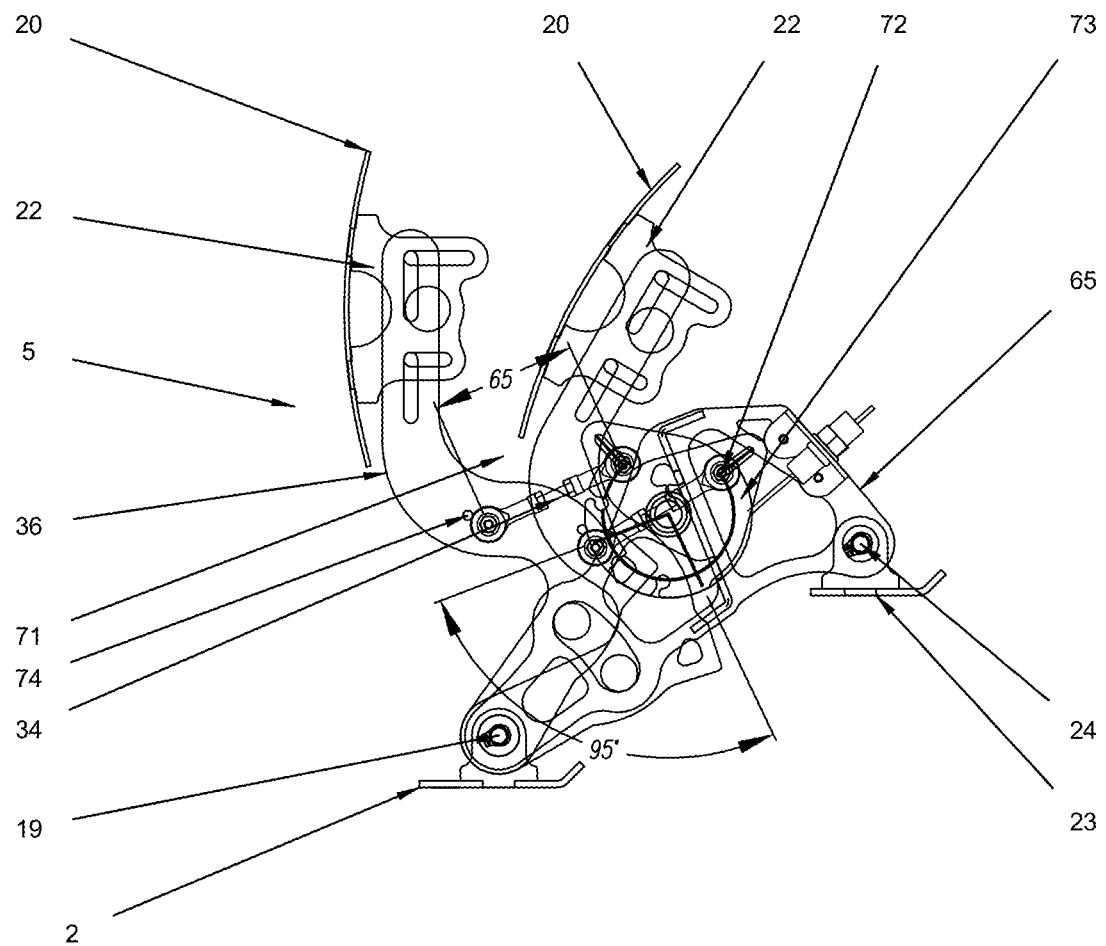
FIG. 17 shows with corresponding numbering a side elevation of pedal box assembly with an alternative throttle adjustment mechanism geometry in which the link arm has been shifted from the centre opening to an opening nearest to the end plate.
Figure 18:
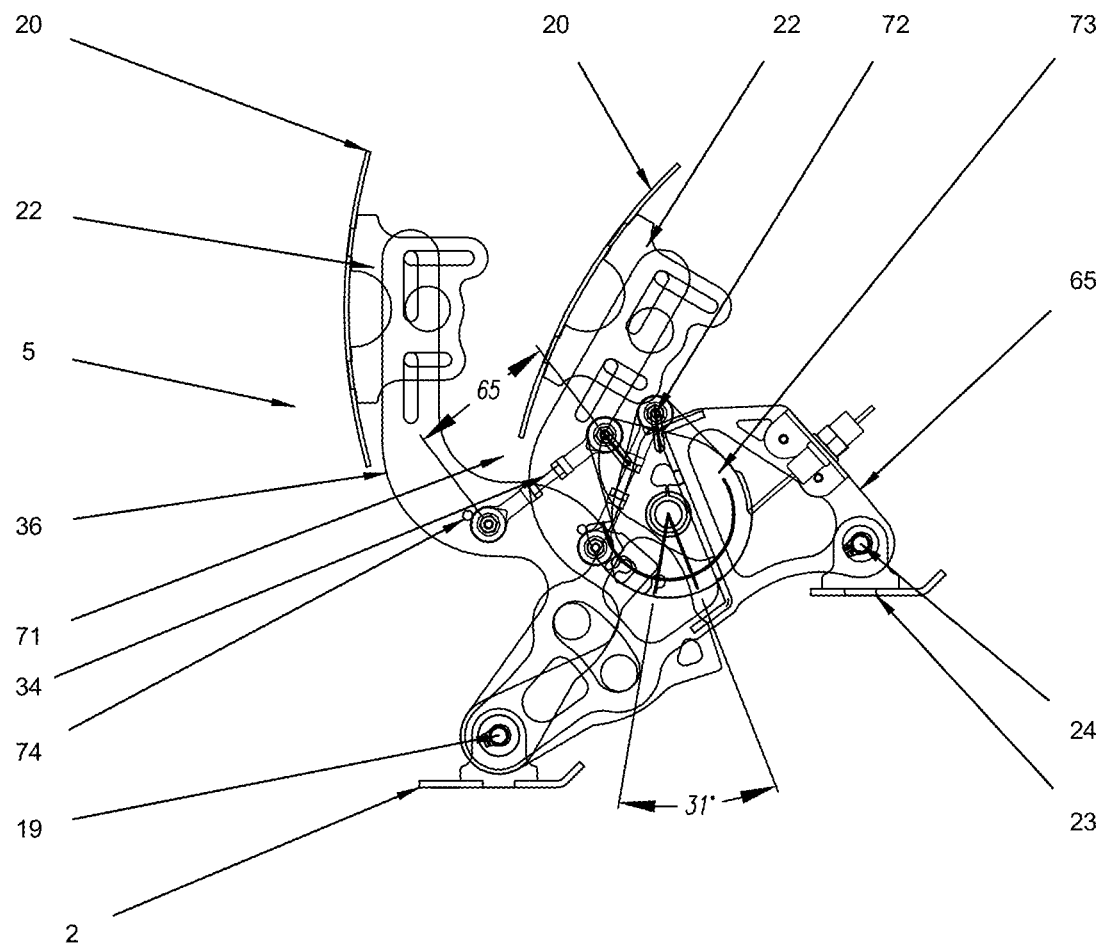
FIG. 18 shows link arm relocated to the opening nearest to the end terminating in support plate and with rocker arm defining an alternative arc.

FIG. 17 shows with corresponding numbering a side elevation of pedal box assembly 1 with an alternative throttle adjustment mechanism geometry. It will be noted that link arm 34 has been shifted from the centre opening of openings 74 to the opening nearest to the end plate 2. Link arm is shown as 65 mm and the rocker 73 defines an arc of 95.7 degrees. In FIG. 18 link arm 34 has been relocated to the opening 74 nearest to the end terminating in support plate 2. Rocker arm in this arrangement defines an arc of 31.3.

The apparatus of the invention utilizes some conventional components and the invention resides in the combination of these conventional components and the manner of use thereof. Hence, any conventional materials and designs of the individual components are acceptable to the present invention so long as the materials and designs function in the manner described.

While the principles of the invention were hereinbefore described with reference to the drawings and preferred embodiments, the specific illustrations of the invention are intended to only exemplify, rather than limit, the invention, and the invention is applicable to the extent described above, and as defined in the statements of invention and the various embodiments.

It will be recognised by persons skilled in the art that numerous variations and modifications may be made to the invention broadly described herein without departing from the overall spirit and scope of the invention.

What is claimed is:

1. A pedal box assembly for mounting in a vehicle, the assembly comprising:
   a brake assembly;
   a clutch assembly and a throttle assembly each mounted on an axis supported by a first mounting plate;
   a master cylinder operatively connected to each said brake assembly and clutch assembly;

said pedal box assembly including cooperating vehicle floor mounting plates, the first of said plates arranged for mounting on a first part of the floor of the vehicle and a second plate which is arranged for mounting on another part of the floor of the vehicle;

the first and second plates are each pivotally mounted to accommodate the respective first and second floor parts to which the first and second plates are respectively attached;

said first plate pivotally mounted to a first axle allowing the first plate to rotate through an arc between a range of 0-180 degrees and to allow the first floor part to accommodate the pedal box assembly;

the second mounting plate pivotally mounted to a second axle allowing rotation of the second plate through an arc between a range of 0-270 degrees to allow the second floor part to accommodate the pedal box assembly;

the mounting of the first and second plates to the respective first and second floor parts presenting pedals of the brake, clutch and throttle assemblies in an orientation for a driver;

each said pedal being vertically and rotationally adjustable to allow a change in orientation relative to its support strut and to accommodate a driver position;

each said pedals connected to its support strut via connecting brackets;

the assembly further comprising a plurality of support frames each having first and second ends, the first end of each said support frames retaining the first axle and the second end of each said support frames retaining the second axle;

the clutch, brake and throttle pedal assemblies each including a support strut pivotally attached at a first end to the first axle;

a first of said struts receiving and retaining at a second end a clutch pedal;

a second of said struts receiving and retaining at a second end a brake pedal and a third of said struts receiving and retaining at a second end a throttle pedal; and the pedal box assembly further comprising a throttle response adjustment assembly which allows fine adjustment of the throttle to alter response during travel of the throttle pedal, the throttle response adjustment assembly including a link arm having a first end connected intermediate the throttle pedal strut and a second end which is retained by a rocker arm.

2. The pedal box according to claim 1, wherein the rocker arm has first and second ends, the first end pivotally connected to the second end of the link arm and the second end of the rocker arm engaging a first end of a return spring.

3. The pedal box according to claim 2 wherein, when the threaded member of the link arm when rotated extends and retracts said link arm and when rotated in a first direction the responsiveness of the throttle pedal is reduced over at least part of its full range of travel.

4. The pedal box according to claim 3, wherein, when the threaded member of the link arm is rotated in a direction which extends the link arm to a maximum extent, the throttle is most effective towards the end of its range of travel; and wherein, when the threaded member of the link arm is rotated in a direction which reduces the link arm to a minimum extent, the throttle is most effective towards the beginning of its range of travel.

5. The pedal box assembly according to claim 4, wherein when the second plate is disposed in an elevated position relative to the first plate.

* * * * *